June 2, 1931. F. CLARK 1,807,687
SIFTER
Filed Sept. 5, 1930
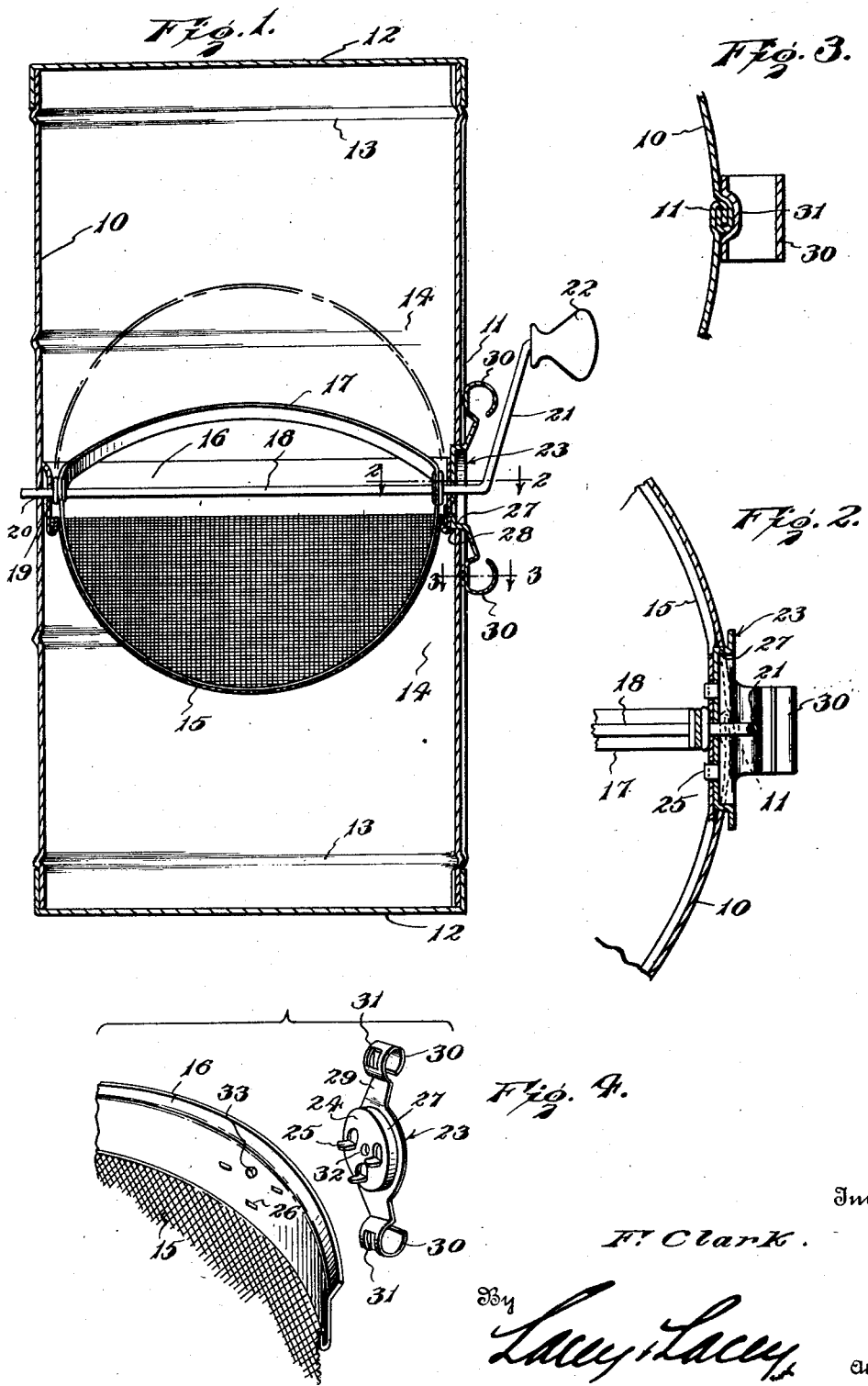
Inventor
F. Clark.
By Lacey & Lacey
Attorneys Patented June 2, 1931

1,807,687

UNITED STATES PATENT OFFICE

FRANK CLARK, OF DOLLIVER, IOWA

SIFTER

Application filed September 5, 1930. Serial No. 479,949.

This invention relates to sifters for sifting flour and like materials and also for mixing with the flour other pulverized materials, such as soda, baking powder, salt and the like in preparing the flour for special baking purposes.

An object of the invention is to provide a sifter of the type having a reversible sieve and agitator, novel means being provided for reversing the sieve and automatically locking the same in either of its reversed positions.

A further object of the invention is to provide a sifter in which the reversible sieve is rigidly secured to a disk which is journaled in an opening in the container, and is provided with opposite loops forming finger rests for reversing the sieve, said loops being resilient and having notches adapted to spring over the vertical seam of the container and automatically lock the sieve in either of its reversed positions.

With the above and other objects in view the invention consists in certain novel details of construction and combinations of parts hereinafter fully described and claimed, it being understood that various modifications may be resorted to within the scope of the appended claim without departing from the spirit or sacrificing any of the advantages of the invention.

In the accompanying drawings forming part of this specification,

Figure 1 is a longitudinal sectional view through a sifter embodying my improvements, Fig. 2 is a fragmentary sectional view taken on the line 2—2 of Fig. 1, Fig. 3 is a fragmentary sectional view taken on the line 3—3 of Fig. 1, and Fig. 4 is a detail perspective view showing the disk separated from the marginal band of the sieve to show the manner of connecting these parts.

Referring now to the drawings in which like characters of reference designate similar parts in the various views, 10 designates a cylindrical container which may be formed from a single sheet of metal bent upon itself and the end edges crimped together, as shown at 11, to form a vertical seam. The container is provided at both ends with removable covers 12 which engage beads 13 formed in the ends of the container which limit movement of the covers to closed position. The container may also be provided with beads 14 intermediate the ends thereof for stiffening the container to resist distortion.

Disposed within the container is a reversible sieve 15 which is provided with a circular metal flange 16 at the open end of slightly less diameter than the inner diameter of the container. A beater or agitator 17 is mounted to turn within the sieve. The shaft 18 of the agitator is passed through openings 19 and 20 formed respectively in the flange 16 and wall of the container. The opposite end of the shaft is provided with a crank 21 and knob 22 for rotating the agitator. For reversing the sieve 15 in the container and locking the same in either of its extreme positions, a swivel latch, designated in general by the numeral 23, is employed. The latch is preferably formed from a single piece of metal stamped out to provide a disk 24 having staggered tabs 25 struck therefrom which are passed through openings 26 in the flange 16 of the sieve and then clamped on the inner face of the flange to fixedly secure the latch to the sieve. The disk 23 terminates in a circumferential flange 27 which is rotatably mounted in an enlarged opening 28 formed in the wall of the container. At opposite points in said flange obliquely disposed arms 29 project. The arms are terminally bent to provide loops 30 against which the thumb and forefinger of the hand may be brought to bear to turn the swivel latch on its axis in order to reverse the position of the sieve.

The loops 30 are resilient and are provided on the inner sides with longitudinal depressions 31, best shown in Fig. 4. These depressions receive the seam 11 of the container, as best shown in Fig. 3, and frictionally lock the swivel latch to the body of the container so as to prevent accidental dislodgment of the sieve during rotation of the agitator.

The disk 24 of the swivel latch is provided with an axial opening 32 through which and a similar opening 33 in the flange of the sifter, the agitator shaft 18 is passed.

To operate, one of the covers is removed and the material to be sifted and mixed is measured into the sifter. Replacing the cover, the agitator is rotated by turning the crank until all of the material has been forced through the sieve into the bottom of the container. The sieve is now reversed one-half revolution by placing the thumb and forefinger against the loops 30 of the swivel latch and turning this latch on its axis until the depressions 31 in the spring loops 30 engage over the seam 11 on the container. In this position of the swivel latch, the sieve is reversed to extend upwardly in the container. Now the container is reversed endwise and the agitator may again be rotated to force the material through the sieve as above described. These operations are repeated until the material has been sufficiently sifted or mixed.

If it is desired to use the sifter as an ordinary sieve, both covers may be removed.

Having thus described the invention, I claim:

A sifter comprising a cylindrical container formed from a single sheet of metal having the ends crimped to provide a vertical seam, removable covers for the ends of said container, an agitator in the container, a reversible sieve in the container, a swivel latch fixedly secured to said sieve and having a flange journaled in an enlarged opening formed in said container at said seam, and oppositely disposed arms projecting from said flange and terminating in spring loops having recesses to receive said seam and maintain said sieve in either of its reversed positions.

In testimony whereof I affix my signature.

FRANK CLARK. [L. S.]